Dec. 29, 1959     H. PELZ     2,919,099
DEVICE FOR WEIGHING BATCHES OF A GRANULAR MATERIAL
Filed Nov. 22, 1955     4 Sheets-Sheet 1

Inventor:
HANS PELZ

Dec. 29, 1959 H. PELZ 2,919,099
DEVICE FOR WEIGHING BATCHES OF A GRANULAR MATERIAL
Filed Nov. 22, 1955 4 Sheets-Sheet 4

Inventor:
HANS PELZ

United States Patent Office 2,919,099
Patented Dec. 29, 1959

2,919,099
DEVICE FOR WEIGHING BATCHES OF A GRANULAR MATERIAL
Hans Pelz, Braunschweig-Riddagshausen, Germany
Application November 22, 1955, Serial No. 548,482
3 Claims. (Cl. 249—15)

The present invention relates to a device for weighing batches of a granular material, and more particularly to weighing devices in which the material to be weighed is subdivided into a main or reduced quantity and an additional or separated quantity of material.

In weighing devices of the type contemplated herein, a quantity of material known as a compensating or separate quantity is segregated from the delivered batch. This compensating quantity of material will be substantially equal to the amount of material which will leave the supply opening but not yet reach the load pan at the instant of closure of the supply opening, that is to say, equal to the weight of material in the flight toward the load pan after closure of the supply opening.

An equalizing vessel or compensating receptacle is provided which contains an amount of material which is equal to this excess amount. The contents of this compensating receptacle is weighed with the material contained in the load pan. However, this additional material is not emptied with the contents of the load pan but is retained in the compensating vessel. Thus the amount of material in the load pan plus the material in flight at the instant of closure of the supply opening and then deposited in the load pan before it is emptied will correspond to the desired weight. After emptying of the load pan, the contents of the compensating receptacle is deposited therein and constitutes a minor portion of the material accumulated during the subsequent weighing operation.

Summarizing it may be stated that the amount of material in the compensating receptacle is weighed with but not added to the amount of material in the load pan for the particular weighing operation. Hence, it compensates for the excess material which has left the supply opening and is in flight but does not reach the load pan at the instant of closure of the supply opening.

It is an object of the present invention to provide an improved weighing device incorporating a compensating receptacle.

It is another object of the present invention to make the compensating quantity of material adjustable by adjustment of the time interval during which the compensating receptacle is being filled.

It is a further object of the present invention to reduce the overall height of the weighing device.

It is still another object of the present invention to reduce the cost of the weighing device.

Other objects and advantages of the present invention will become apparent from the following detailed description thereof in connection with the accompanying drawings showing, by way of example, two embodiments of the present invention. In the drawings.

Figure 1:
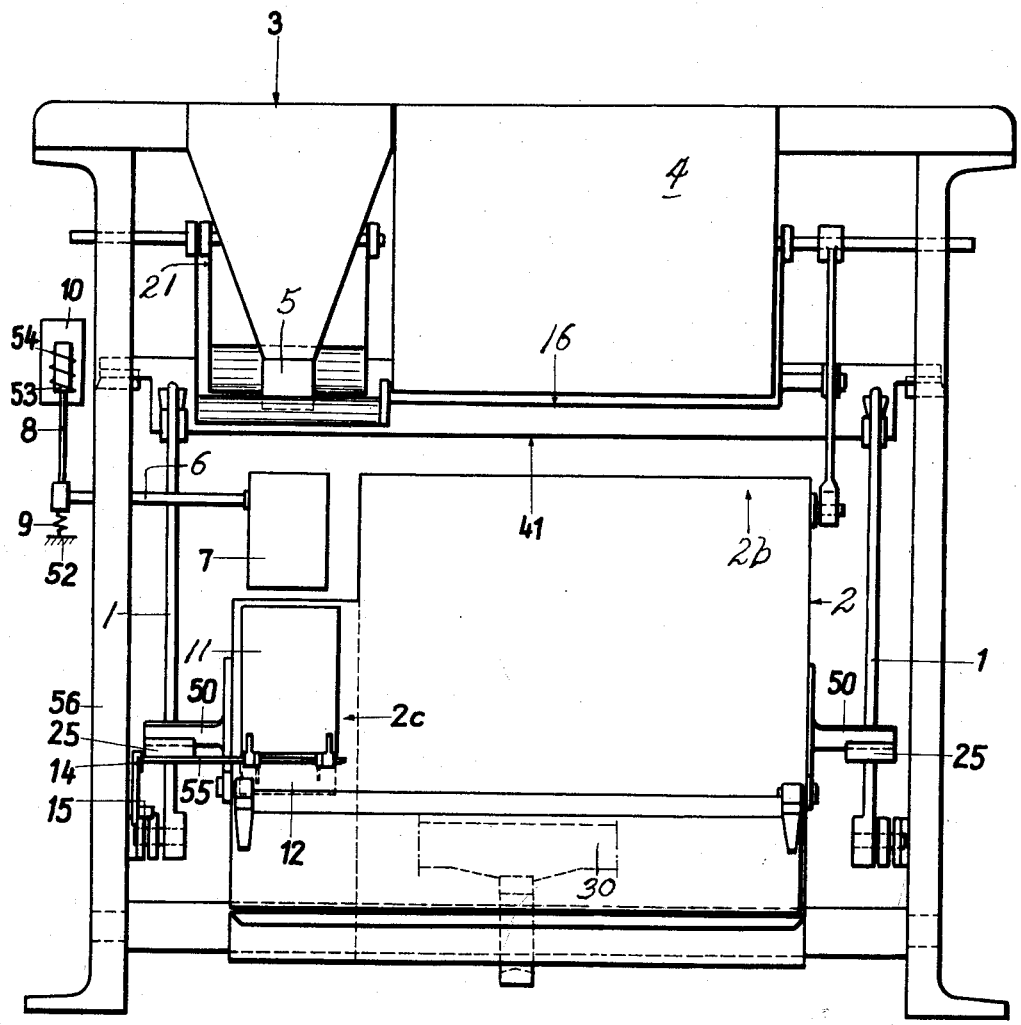
Fig. 1 is a front elevation of a first embodiment of the present invention.
Figure 2:
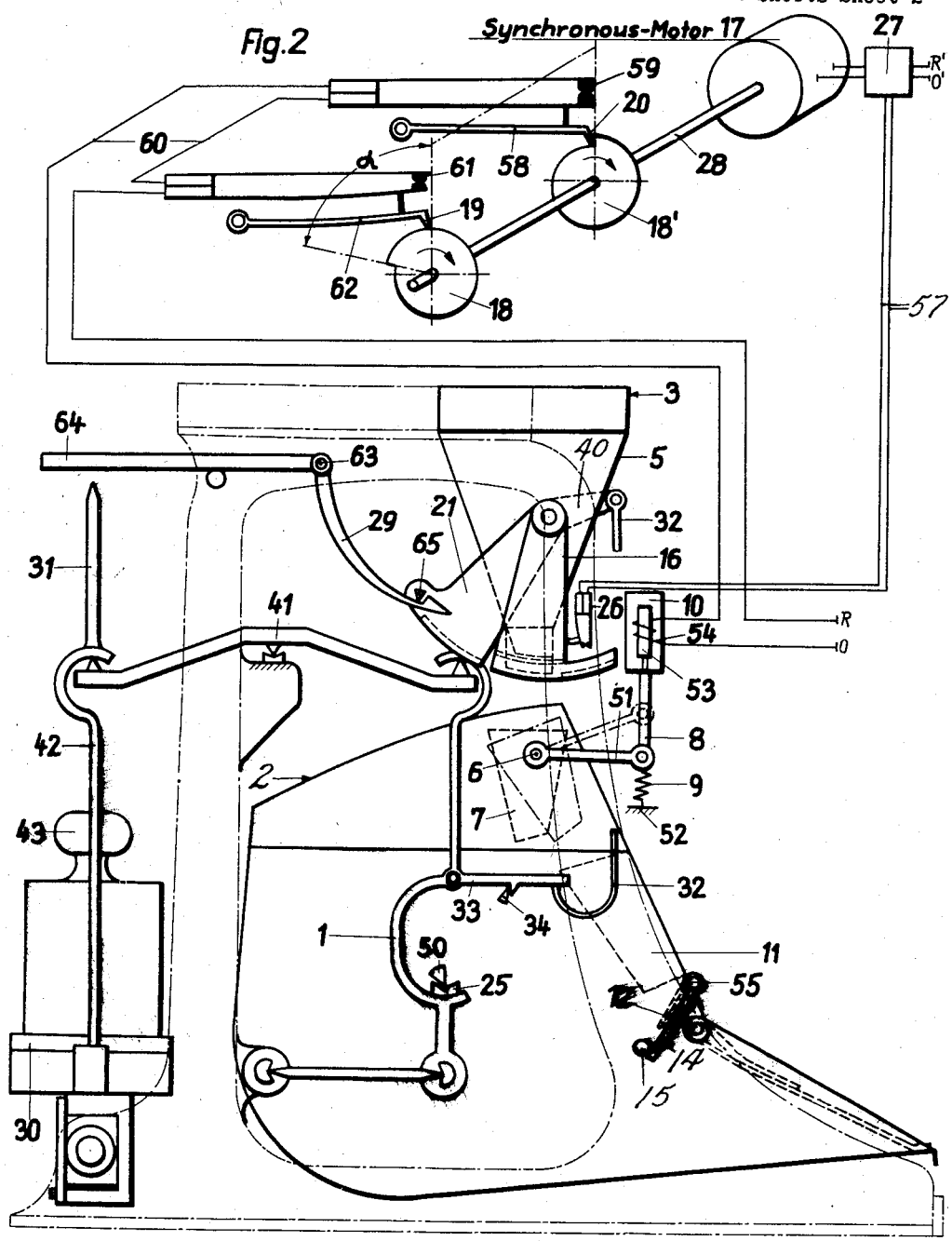
Fig. 2 is a side elevation of the embodiment shown in Fig. 1 seen from the left, some parts being shown in perspective view.

Referring now to the drawings and first to Figs. 1 and 2, an automatic weighing device is shown comprising a balancing two-armed scale beam or lever 41 supported on a knife edge fulcrum. One arm of the two-armed beam 41 carries a suspension 42 for a weight holder 30 supporting a weight 43. Bails 1 are supported by the other arm of the two-armed beam 41. Bails 1 carry knife edge supports 25. A load pan 2 is rotatable so that it may be emptied by tilting about its knife edge shaped axles 50, which axles rest on knife edge supports 25. Load pan 2 is adapted to be loaded with material through a main inlet 4 or from a hopper 3 having an auxiliary inlet 5, which inlets are opened in succession. At first, the main quantity of material flows through main inlet 4 into the main portion 2b (Fig. 1) of load pan 2, then main inlet 4 is closed and material flows through auxiliary inlet 5. The auxiliary material enters load pan 2 as a fine spray until the scale beam 41 assumes a horizontal position at balance. A funnel 7 is arranged below auxiliary inlet 5. Funnel 7 is rigidly mounted on a horizontal axle 6 rigid at one end of an arm 51. The arm or tie rod 51 is pivotally connected to a rod 8 acted upon by a return tension spring 9. Rod 8 is an extension of an armature 53 of an electromagnet 10 which has a winding 54 energized by a current taken from terminals "O" and "R" (Fig. 2). Load pan 2 has a portion 2c (Fig. 1) which is lower than portion 2b. This portion 2c receives the stream of material passing through the funnel 7. A box-like receptacle 11 is rigidly connected to the portion 2c of the load pan 2 so that it will receive the material leaving the auxiliary inlet 5 when, and only when, the funnel 7 is brought into the position indicated in Fig. 2 by dash-dotted lines by the electromagnet 10. The box-like receptacle 11 is closed by a hinged bottom gate 12; gate 12 is rotatable about an axle 55 rigidly connected with a lever 14. Lever 14 slides during the return motion of the load pan 2 after the emptying thereof along a stationary stop 15 connected to the left-hand pillar 56 (Fig. 1) of the frame. Thus after the emptying of the load pan 2, the stationary stop 15 causes the hand lever 14 to release the gate 12 for a short time so that the contents of the receptacle or equalizing vessel 11 are directed into the load pan so as to form the starting material for a renewed filling thereof.

The operation of this device is as follows:

After the material to be weighed has left the main inlet 4, a flap 16 is displaced so as to interrupt the connection of the main inlet 4 with the main portion 2b of the load pan 2. By the closing motion of the flap 16 contact members 26 are operated to interconnect connections 57 leading to a relay, indicated diagrammatically by 27. When energized, relay 27 connects the supply terminals R', O' to a synchronous motor 17. Each time relay 27 is closed, motor shaft 28 is driven by motor 17 to carry out one full revolution. Two cams 18 and 18' are secured to motor shaft 28; the two cams 18 and 18' are relatively staggered by an angle $\alpha$. As the cams 18 and 18' rotate in the direction of the arrows, at first a lever 58 having a tip portion 20 engaging the circumference of the cam 18 is actuated to close the contacts 59 by which the current for the winding 54 of the electromagnet 10 is switched in. The lead wires 60 between the winding 54 of the electromagnet 10 and the contacts 59 are connected to contacts 61 which are held in a closed position by a lever 62 having a tip portion 19 sliding on the circumference of the cam 18. It will be understood that the electromagnet 10 is energized during a time interval corresponding to the angle $\alpha$ and brings the funnel 7 into the position thereof indicated in Fig. 2 in dash-dotted lines. Hence, a predetermined portion of material to be weighed depending upon the size of the angle $\alpha$, is deflected from the auxiliary stream and received by the box-like equalizing receptacle 11. This predetermined portion of deflected material constitutes the compensating loading of the load pan 2. However, after the shaft 28 has rotated through the angle α, the portion 19 engages the reduced diameter of the cam 18 so that contact 61 is opened and the current is interrupted, thus deenergizing the winding 54 of the electromagnet 10. In consequence thereof its spring 9 returns the arm 51 into the initial position shown in full lines in Fig. 2 so that the tiltable funnel 7 returns into its rest position thereof indicated in dashed lines in Fig. 2.

The compensating magnitude of the loading depends on the duration of the period of time during which the auxiliary stream of granular material is deflected into the receptacle or equalizing vessel 11. This period of time is adjustable in a continuous manner by changing the angle α, for instance, by loosening the cam 18, which is held in a predetermined position by a set screw (not shown) on shaft 28, adjusting the angular position of cam 18 and tightening said set screw. By closing a flap 21, arranged coaxially with flap 16, auxiliary inlet 5 is closed and the weighing operation is finished. This closing of flap 21 is caused by a two-arm lever 29 pivotally about an axle 63 and engaging a stop 65 on flap 21. When scale beam 41 reaches its horizontal balancing position, a push rod 31 connected to suspension 42 engages the other arm 64 joined to lever 29 at pivot 63. The tilting of load pan 62 is initiated by flap 21 as said flap closes auxiliary inlet 5. Such closing action lifts a pawl 33 off a knife edge 34 because of corresponding movement of a lever arm 40 extending from flap 21, which arm 40 lifts a connected tie arm 32 engaging at its bottom end the pawl 33. Tie arm 32 is actually an extension of flap 21. Knife edge 34 is rigidly connected with load pan 2. This action frees load pan 2 for a tilting movement and it tilts automatically because its center of gravity is arranged on one side of the vertical line running through the line of its suspension defined by knife edge shaped axles 50. During this motion the receptacle 11 is not emptied because it is closed by the bottom gate 12. In consequence thereof the contents of the receptacle 11 takes part in the weighing operation but is withheld from the dumping operation; said contents are transferred to the load pan 2 only at the beginning of the subsequent weighing operation or filling of the load pan 2.

Figure 3:
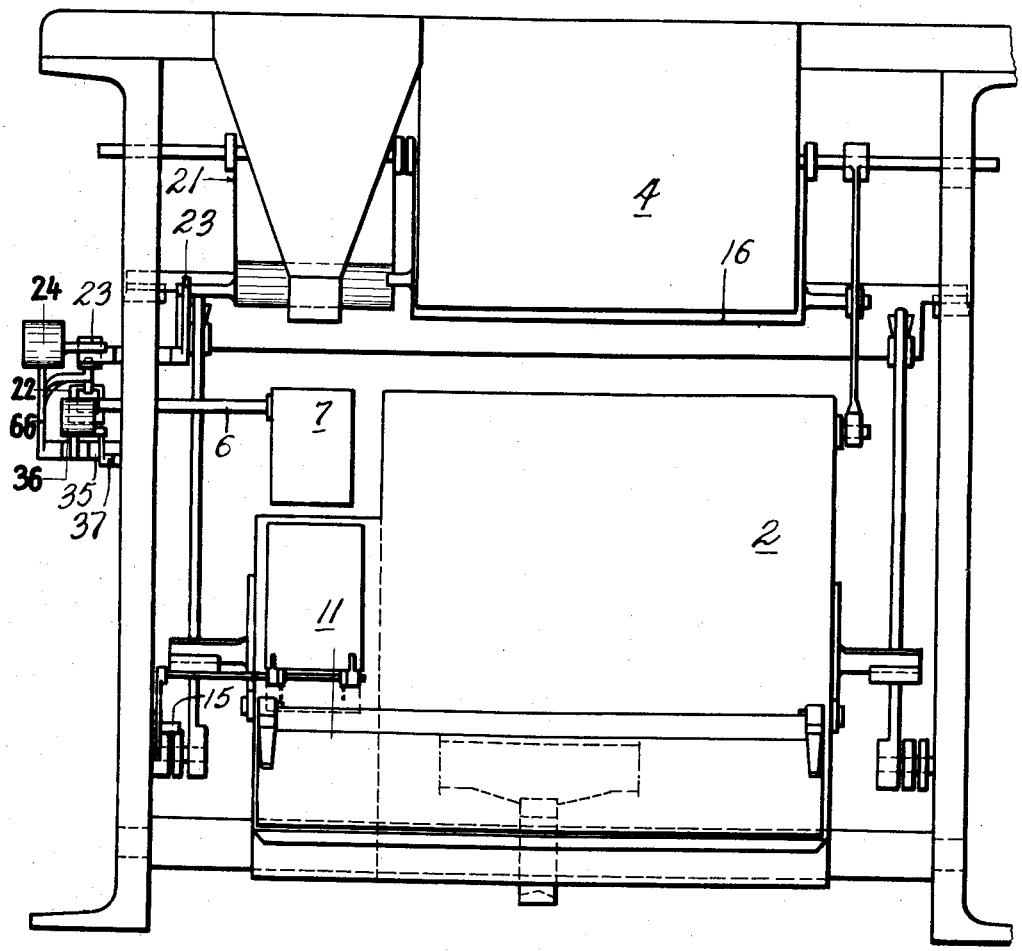
Fig. 3 is a front elevation of a second embodiment of the present invention.
Figure 4:
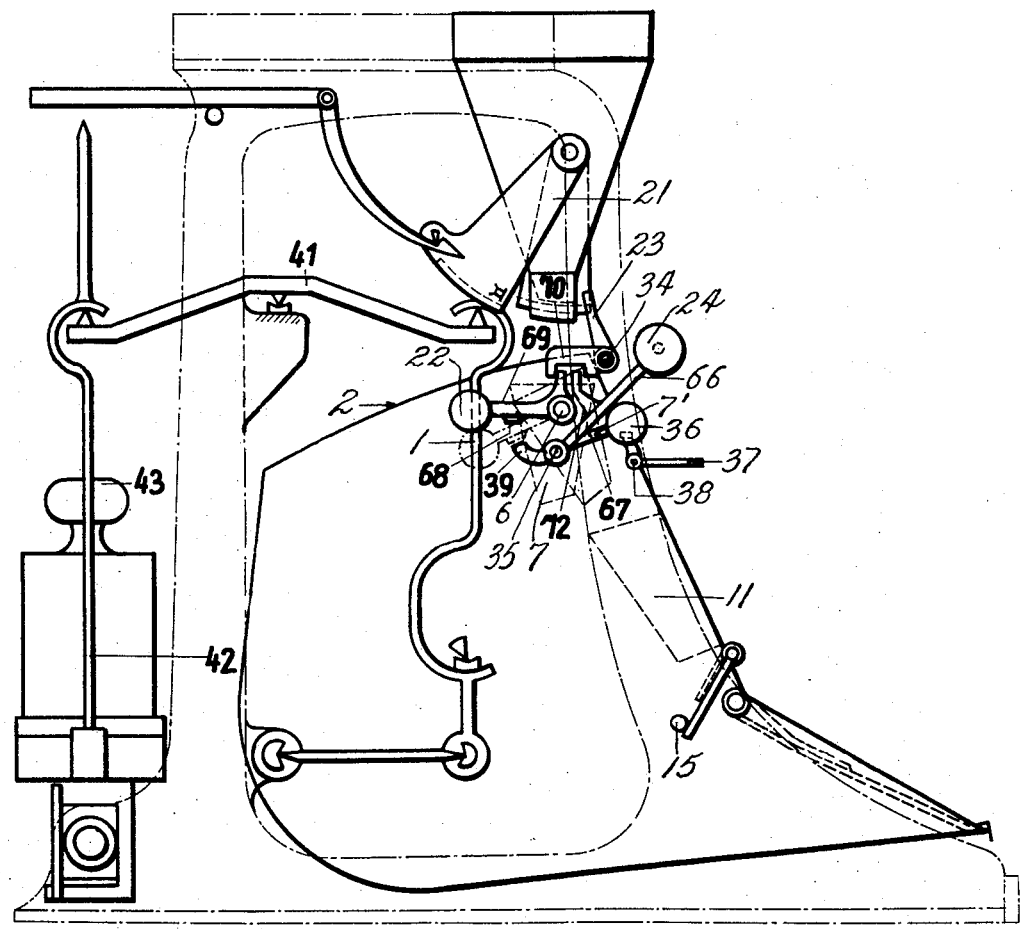
Fig. 4 is a side elevation of the embodiment shown in Fig. 3 seen from the left.

Referring now to the embodiment shown in Figs. 3 and 4, the same differs from that shown in Figs. 1 and 2 in that the electrical control of the funnel 7 is replaced by a mechanical control.

This is accomplished in the following manner.

A weight 22, connected with a lever arm 69 arranged for rotation about the axle 6 of the funnel 7, is caught in the starting position thereof by an arm 70 rigidly connected with a pawl 23 rotatable about the axle 34. In addition, the pawl 23 holds an arm 7' rigid with the pendulum rod 66 of a pendulum weight 24, the rod 66 being pivoted to a stationary axle 35. Furthermore, a weight 36 is connected to a rod 67 pivotably connected to the axle 35. The weight 36 is held in the initial position thereof by a supporting lever 37 pivoted to the axle 38.

By the closing motion of the flap 16, closing the main inlet 4, the pawl 23 is released so that the funnel 7 assumes under the action of the weight 22 the position thereof shown in dash-dotted lines, so that part of the auxiliary stream of material is deflected into the receptacle 11. Simultaneously the pendulum weight 24 is released by the movement of the pawl 23 so that the pendulum weight 24 swings downward and hits the supporting lever 37, and rotates the same about the axle 38 thereof so that the weight 36 returns the funnel 7 into its initial position by means of a stop 39 forming an extension of the rod 67 and cooperating with a counterstop 68 arranged on the lever arm 69 connecting the weight 22 with the axle 6.

Thus it is seen that by the return motion of the falling weights 22, 36, and 24 the funnel 7 is returned to the initial position thereof.

The period of time during which the funnel 7 is deflected may be adjusted by an adjustment of the pendulum weight 24 on the pendulum rod 66 thereof.

If desired, the quantity of material separated from the batch of granular material may act on the beam system of the balance by means of a reduction of step-up gear (not shown). According to the ratio of the gear relatively less or more separated material is needed for an automatic balancing of the weighing device.

I have described hereinbefore preferred embodiments of a weighing device according to my invention. However, I wish it to be understood that numerous changes, modifications, and substitutions of equivalents may be made in the embodiments of the weighing device described hereinabove, the novelty of my invention being defined by the appended claims.

I claim:
1. A balancing scale for accurately weighing out and delivering batches of material incorporating a movable balancing scale beam comprising, a load pan suspended from one side of said beam, first means for feeding a batch of material into said load pan, second means for interrupting said feed in response to beam movement, the material so deposited in said load pan being an amount less than the amount of material to be delivered; third means for depositing a fine spray of material into said load pan, a vessel suspended from said same side of said scale beam, a funnel pivotally suspended above said receptacle and adapted to move from one to another of two positions, said funnel being adapted to deflect a portion of said spray flow into said vessel for one of said positions, an electric circuit including a relay and switching means, said relay when energized pivoting said funnel to the position in which a portion of the spray is deflected into said receptacle, a motor having a shaft rotatable therewith, cam means carried by said shaft and undergoing common rotation, said switching means being controlled by said cam means to make and break said relay circuit and to energize said relay for a predetermined time interval during which said cam means traverse a predetermined angle; a normally open operating circuit for said motor, said operating circuit being closed in response to feed interrupting action by said second means, fourth means for terminating said fine spray, a mechanical linkage extending between said scale beam and said fourth means, said mechanical linkage operating said fourth means in response to a balanced position of said balancing scale beam due to the aggregate capture of material in said load pan and vessel, and fifth means for effecting the delivery of the material captured in said load pan but not including the quantity of material captured in said vessel, said fifth means being operated by said fourth means.

2. A device as defined in claim 1 in which said cam means are manually adjustable to vary said predetermined angle whereby, the predetermined time interval during which said relay is energized may be preset.

3. A device as defined in claim 1 further comprising, a tie rod, said tie rod being rigidly connected to said funnel, and resilient means connected to said tie rod, said resilient means urging said funnel to occupy its undeflecting position, said relay having an armature, said armature being secured to said tie rod to force it against the action of said resilient means when said relay is energized.

References Cited in the file of this patent

UNITED STATES PATENTS

| | | |
|---|---|---|
| 455,120 | Schmidt | June 30, 1891 |
| 607,465 | Richards | July 19, 1898 |
| 669,704 | Perry | Mar. 12, 1901 |
| 1,994,797 | Thomas | Mar. 19, 1935 |